United States Patent [19]

Hinrichs et al.

[11] Patent Number: 5,267,666
[45] Date of Patent: Dec. 7, 1993

[54] MULTIPLE-DOME, SCORED, RUPTURE DISC

[75] Inventors: James O. Hinrichs, Odessa; Earl D. Miller, Jr., Lee's Summit, both of Mo.

[73] Assignee: Fike Corporation, Blue Springs, Mo.

[21] Appl. No.: 5,837

[22] Filed: Jan. 19, 1993

[51] Int. Cl.⁵ .............................. B65D 25/00
[52] U.S. Cl. ..................... 220/89.2; 220/207; 137/68.1
[58] Field of Search ............ 220/89.2, 203, 207; 137/68.1

[56] References Cited

U.S. PATENT DOCUMENTS

| | | |
|---|---|---|
| 2,194,159 | 3/1940 | Bonyun et al. ............ 220/89.2 |
| 2,922,544 | 1/1960 | Hibbard et al. ............ 220/89.2 |
| 3,091,359 | 5/1963 | Wood ....................... 220/89.2 |
| 3,166,837 | 1/1965 | Frick et al. ............ 220/89.2 X |
| 3,484,817 | 12/1969 | Wood . |
| 3,921,556 | 11/1975 | Wood et al. . |
| 4,072,160 | 2/1978 | Hansen . |
| 4,158,422 | 6/1979 | Witten et al. . |
| 4,211,334 | 7/1980 | Witten et al. . |
| 4,342,988 | 8/1982 | Thompson et al. . |
| 4,404,982 | 9/1983 | Ou . |
| 4,512,171 | 4/1985 | Mozley . |
| 4,597,505 | 7/1986 | Mozley et al. . |
| 5,160,070 | 11/1992 | Hibler et al. . |

Primary Examiner—Allan N. Shoap
Assistant Examiner—Paul A. Schwarz
Attorney, Agent, or Firm—Hovey, Williams, Timmons & Collins

[57] ABSTRACT

A multiple-dome, scored rupture disc presents opposing first and second disc faces, and is provided with a circular, central region and a flat annular flange surrounding the central region. An arcuate line of weakness is formed in the disc circumscribing the central area except for a portion of the circumference of the central area defining a hinge about which the central region pivots upon rupture. The central region is divided by a diametrical ridge into two side-by-side semicircular halves within which the disc is bulged to form a plurality of separate concavo-convex bulges in the body.

11 Claims, 5 Drawing Sheets

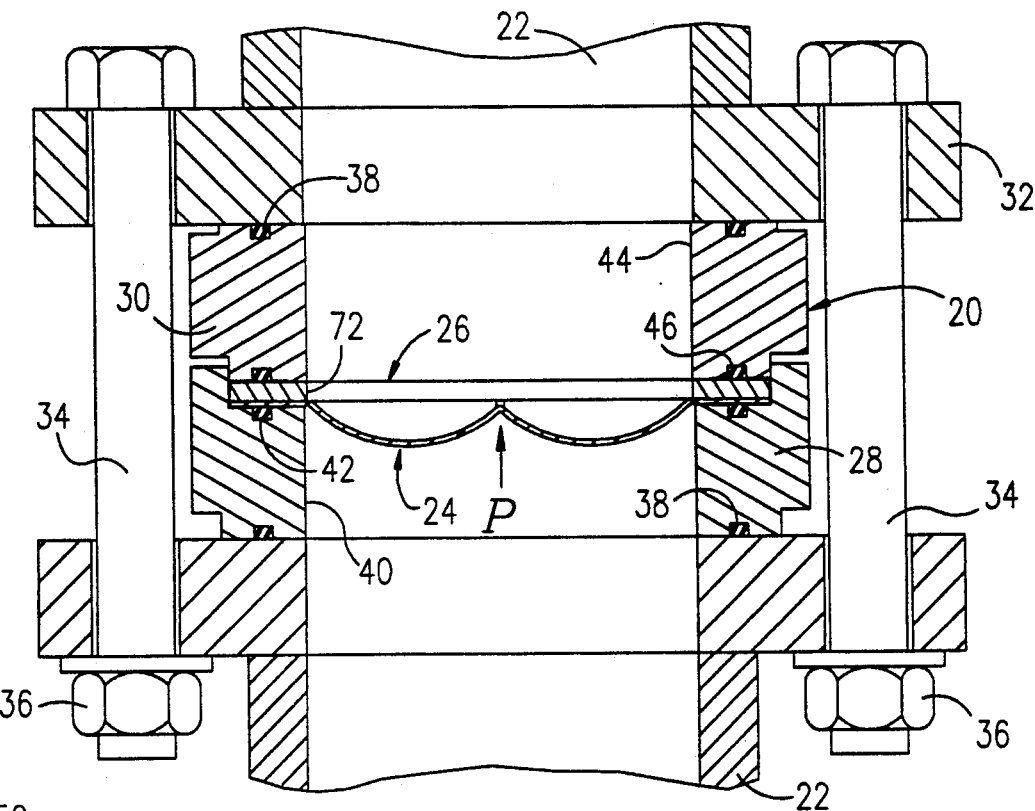
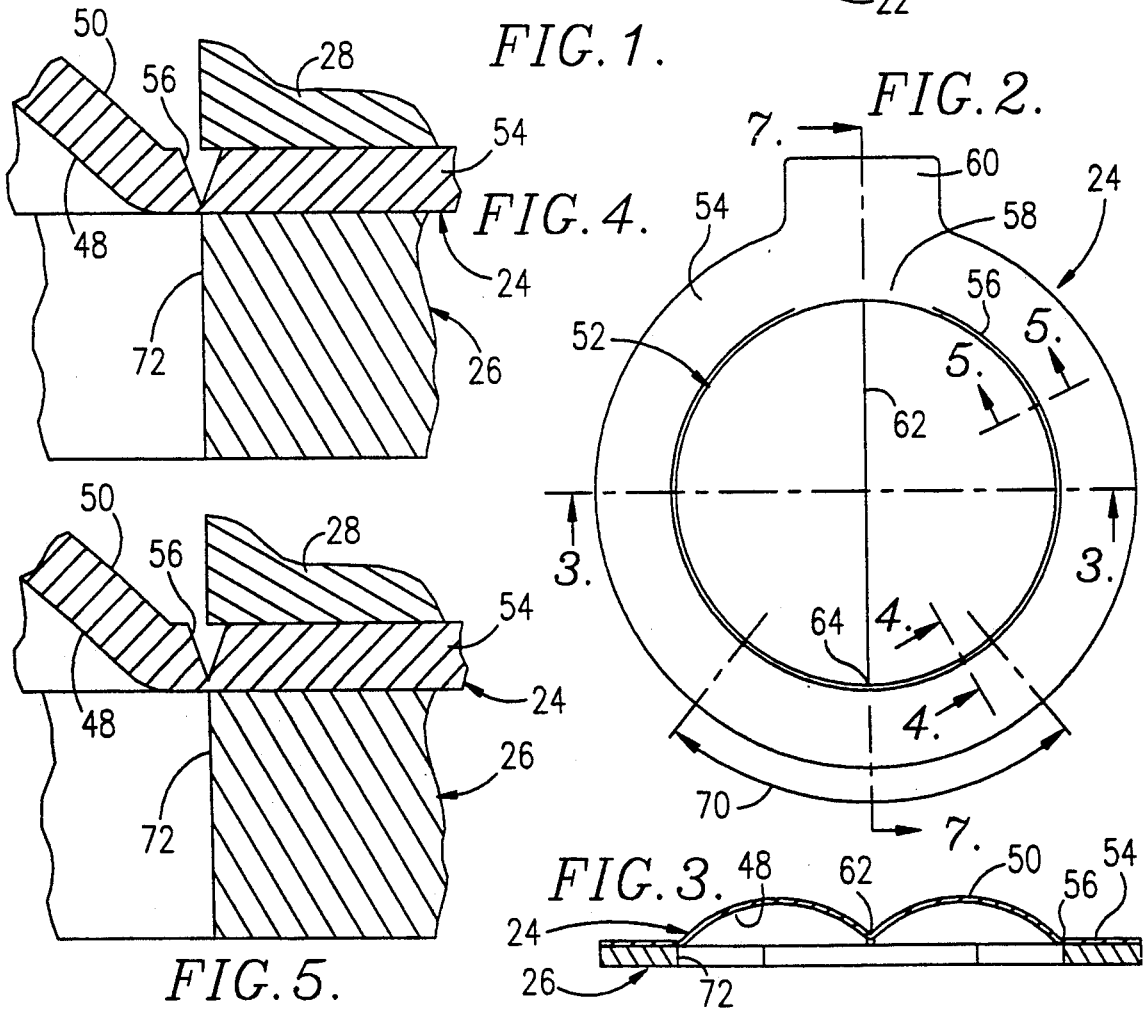

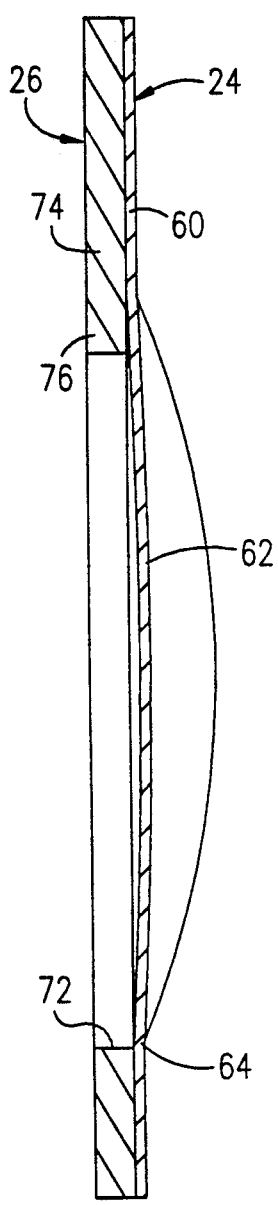
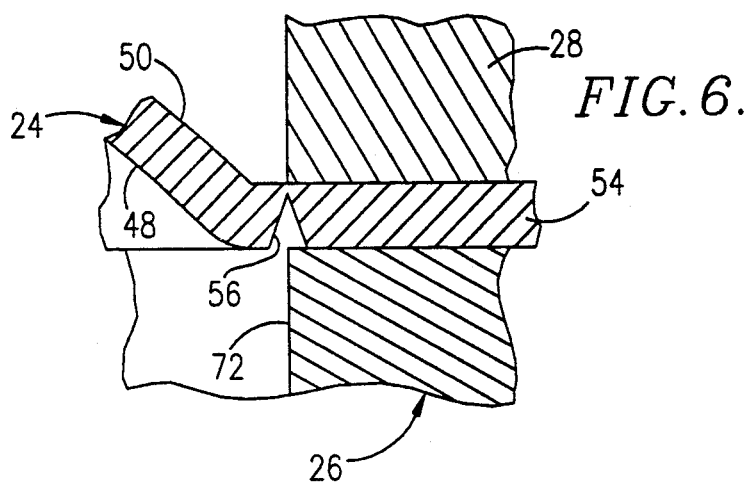
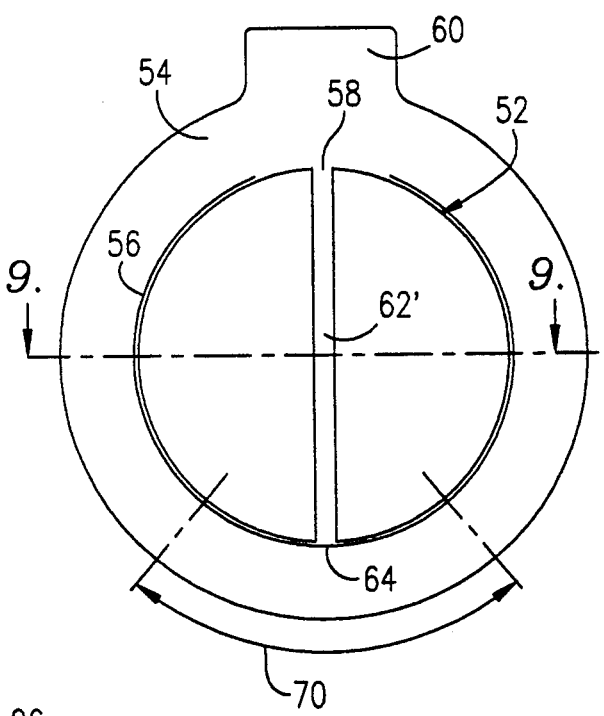
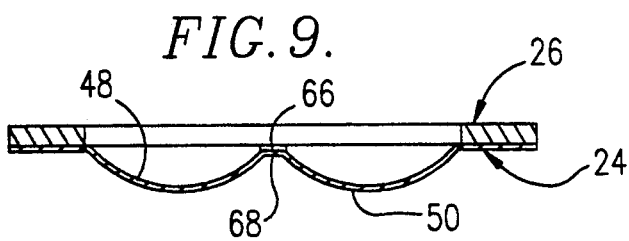

MULTIPLE-DOME, SCORED, RUPTURE DISC

BACKGROUND OF THE INVENTION

1. Field of the Invention

The present invention relates generally to pressure relief systems and, more particularly, to a rupture disc for use in relieving pressure differentials in low-pressure industrial applications and the like.

2. Discussion of the Prior Art

It is conventional to employ a rupture disc as a safety pressure relief apparatus in industrial applications for venting excess pressure differentials within pressurized components or equipment in order to prevent damage to the equipment.

Typically, the construction of a rupture disc includes a unitary disc having a circular central dome region and an outer annular flange. The dome presents a concavo-convex shape corresponding to the shape of the relief passage within which the disc is positioned, and the disc is oriented with the concave surface of the dome in contact with the pressure to be relieved. This construction is referred to as a forward-acting device.

A line of weakness is provided in the disc which substantially circumscribes the dome except for a small portion of the circumference of the central dome region which serves as a hinge when the dome region breaks free of the annular flange during rupture. The line of weakness typically includes a scored line formed in one surface of the disc by any known method.

Conventional discs may be formed of any of a number of different materials, and are operable over a broad range of pressures. However, because of the characteristics of these conventional devices, the equipment should only be operated at pressures up to 80% of the pressure at which the disc is designed to burst in order to avoid premature rupture of the disc. In addition, these discs are not presently constructed to reliably vent low pressures. e.g. in the range of 10–80 psi. for a two inch diameter disc.

In contrast to these forward-acting discs, assemblies of the reverse-acting type are also known, and are typically capable of handling normal operating pressures up to 90% of the rated pressure of the disc. These assemblies typically include a disc having a central dome region of concavo-convex shape, wherein the disc is positioned in the relief passage with the convex surface in contact with the positive pressure to be relieved.

In reverse-acting rupture discs, it is possible to employ a line of weakness around the dome region in order to control both the pressure at which rupture occurs and the manner in which the dome region tears to allow relief of the pressure. For example, it is known to provide lines of weakness across the dome region in order to cause the dome region to tear into quarters which are folded back under a relief pressure.

One concern with reverse-acting rupture discs of this type is that it is difficult to obtain a construction which is able to reliably vent low pressures, e.g. in the range of 10–80 psi. for a two inch diameter disc.

It is known to employ a knife blade assembly in a reverse-acting rupture disc assembly as a means for ensuring that the disc ruptures at low pressures when buckling of the disc occurs. In these systems, the knife blade is located downstream of the disc in the direction of travel of the positive pressure being relieved, adjacent the concave surface of the disc.

Because the blade must be disposed on a particular side of the disc, there are particular applications in which the blade assembly is exposed to corrosive environments which corrode the blade to the point of failure. In addition, the existence of a knife blade in a rupture disc assembly presents the potential for injury to installers and maintenance personnel, and is undesirable.

OBJECTS AND SUMMARY OF THE INVENTION

It is an object of the present invention to provide a multiple-dome, scored, reverse-acting rupture disc which eliminates the need for knives within the assembly, while providing reliable operation at relatively low pressures.

It is another object of the present invention to provide a low-pressure rupture disc which accommodates working pressures as high as 90% of the burst pressure, or higher, while reliably and completely bursting at the desired burst pressure. Such reliable operation of the rupture disc is achieved in both vaporous and liquid applications, and is possible even in corrosive chemical applications.

In accordance with the present invention, a multiple-dome, scored rupture disc includes an essentially flat, non-apertured disc body presenting opposing first and second disc faces, and including a circular, central region and a flat annular flange surrounding the central region. An arcuate line of weakness circumscribes the central area except for a portion of the circumference of the central area defining a hinge. The central region is divided by a diametrical ridge into two side-by-side semicircular halves within which the disc is bulged to form a plurality of separate concavo-convex bulges in the body.

By providing this construction, numerous advantages are realized. For example, by providing a divided central region including a plurality of separate concavo-convex bulges and a diametrical ridge bisecting the region, the burst pressure of the disc is reduced to a low-pressure value, e.g. to as low as 12 psi for a 12 inch diameter rupture disc, or 22 psi for a 1 inch diameter rupture disc.

In addition, the diametrical ridge functions to initiate rupture of the disc at a point opposite the hinge, while promoting complete rupture of the disc along the arcuate line of weakness, even when the disc is employed in liquid pressure relief applications where pressures drop dramatically as soon as rupture of the disc is initiated.

According to a preferred embodiment of the inventive rupture disc, the line of weakness includes a groove of a depth which varies along the length thereof to define a relatively deep groove section opposite the hinge. This deep groove section assists the diametrical ridge in initiating rupture of the disc at a point opposite the hinge.

The line of weakness may be formed in either surface of the disc in order to accommodate applications in which one side or the other of the disc is subjected to corrosive chemicals. By providing this construction, the harmful effects of such a corrosive environment are minimized.

BRIEF DESCRIPTION OF THE DRAWING FIGURES

A preferred embodiment of the present invention is described in detail below with reference to the attached drawing figures, wherein:

FIG. 1 is a sectional view of a reverse-acting rupture disc assembly constructed in accordance with the preferred embodiment, illustrating the manner in which the assembly is installed in line with a pressurized conduit;

FIG. 2 is a bottom plan view of the reverse-acting disc assembly constructed in accordance with the preferred embodiment;

FIG. 3 is a sectional view of the disc assembly taken along line 3—3 of FIG. 2;

FIG. 4 is a sectional view of the disc assembly taken along line 4—4 of FIG. 2;

FIG. 5 is a sectional view of the disc assembly taken along line 5—5 of FIG. 2;

FIG. 6 is a sectional view of the disc assembly similar to FIG. 5, but illustrating an alternate construction of the disc assembly;

FIG. 7 is a sectional view of the disc assembly taken along line 7—7 of FIG. 2;

FIG. 8 is a bottom plan view of a disc assembly constructed in accordance with an alternate preferred embodiment of the invention;

FIG. 9 is a sectional view of the disc assembly taken along line 9—9 of FIG. 8;

DETAILED DESCRIPTION OF THE PREFERRED EMBODIMENT

Figure 10:
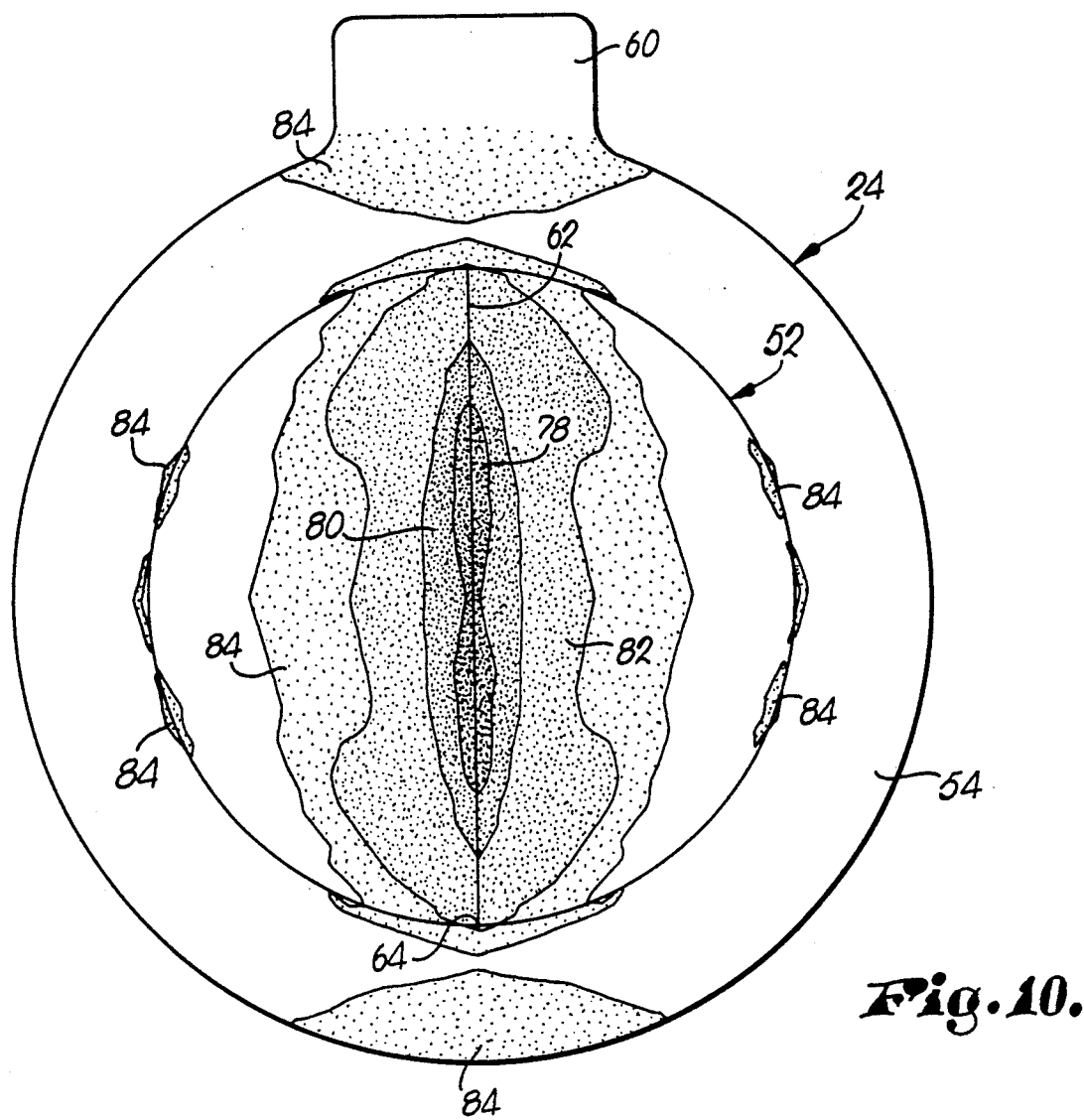
FIG. 10 is a schematic plan view of a disc constructed in accordance with the preferred embodiment, illustrating the concentration of stresses in the disc when pressure is exerted on the central region of the disc in a reverse-acting assembly.

A multiple-dome, scored, reverse-acting, nonfragmenting rupture disc assembly is illustrated in FIG. 1, as installed in a relief passage of any conventional piece of pressurized industrial equipment. The assembly generally includes an insert assembly 20 which is retained between a pair of opposed pipe sections 22, and a rupture disc 24 and alignment ring 26 supported together within the insert assembly.

The insert assembly includes a base 28 and a hold-down 30, and is supported between opposed companion flanges 32 provided on the pipe sections 22. Preferably, a plurality of bolts 34 extend between the companion flanges 32, and nuts 36 are fastened on the bolts to provide sealing contact between the companion flanges and the insert assembly. If desired, annular grooves may be formed on the surfaces of the base 28 and hold-down 30 which engage the companion flanges, and sealing rings 38 may be employed within the grooves for improving the seal between the insert assembly 20 and pipe sections 22.

The base 28 includes a circular central axial opening 40 having a diameter corresponding to the inner diameter of the pipe sections 22. A countersunk axial opening is provided in the axial end of the base opposing the hold-down 30. This countersunk opening is sized to receive the alignment ring 26 and rupture disc 24, as well as an opposing end of the hold-down 30. An annular groove is formed in the bottom surface of the countersunk opening, within which a sealing ring 42 is provided.

The hold-down 30 also includes a circular central axial opening 44 having a diameter corresponding to the inner diameter of the pipe sections. The axial end of the hold-down which opposes the base 28 is sized for receipt within the countersunk opening so that when the insert assembly is compressed between the companion flanges, the hold-down 30 secures the alignment ring 26 and rupture disc 24 against the base 28. An annular groove is formed in the end surface of the hold-down, within which a sealing ring 46 is provided. The sealing rings 38, 42, 46 prevent the leakage of fluids from within the pipe sections and insert assembly.

The rupture disc 24 is illustrated in FIG. 2, and includes an essentially flat, non-apertured disc body presenting opposing first and second surfaces 48, 50, illustrated in FIG. 3, and including a circular, central region 52 and a flat annular flange 54 surrounding the central region. The disc also includes an arcuate line of weakness 56 circumscribing the central region except for a portion of the circumference of the central region defining a hinge 58. The annular flange 54 includes a radially extending tab 60 aligned with the hinge 58 for guiding placement of the disc within the insert assembly 20 during installation.

Depending upon the application in which the rupture disc is to be employed, any of a number of different materials may be used to form the disc. For example, the disc may be formed of stainless steel, nickel, monel, inconel, gold, silver, aluminum, tantalum, titanium, copper, alloys of the foregoing, and any other material which exhibits the necessary physical characteristics to provide reliable relief of pressures when formed into a disc having features in accordance with the present invention.

The rupture disc is preferably formed of a size adapted for use in a pipe having a diameter ranging from 1 to 12 inches in diameter. However, it would be possible to employ a rupture disc assembly constructed in accordance with the present invention in relief passages having different dimensions.

The central region 52 of the disc body is bisected by a diametrical bar or ridge 62 into two side-by-side semicircular halves within which the disc is bulged to form two separate concavo-convex bulges or domes in the body, as shown in FIG. 3. The bulges cover substantially the entire central region 52 apart from the ridge 62, and define concavities in the first surface 48 of the body and convexities in the second surface 50. Although not shown in the drawing, it is possible to further divide each semi-circular half of the central region 52 into smaller fractions and to provide separate concavo-convex bulges in each fractional area so that more than two bulges are provided.

For example, the central region may be bisected by a diametrical line which is perpendicular to the ridge so that the central region is divided into quarters. A separate concavo-convex bulge may be formed in each quarter area so that four bulges are formed in the disc body. Any other suitable number of bulges may be provided in a similar manner.

As shown in FIG. 2, the diametrical ridge 62 extends between the hinge 58 and a point 64 diametrically opposed to the hinge relative to the central region 52. Thus, one end of the ridge is centrally located with respect to the hinge and the opposite end of the ridge intersects the line of weakness at the point 64 directly opposite the hinge.

Turning to FIG. 7, the ridge is shown as being bowed along the length thereof. The direction of curvature of the ridge corresponds to the direction of curvature of the bulges such that the ridge is bowed toward the convex surface of the disc. For example, in a two inch diameter disc formed of stainless steel, the ridge is bowed so that the center of the ridge is laterally displaced relative to a line extending between the axial ends thereof by a distance of about 0.0090 inches. As discussed more fully below, this curvature is added to the ridge in order to strengthen the disc body along the ridge so that the disc first ruptures along the line of weakness 56 at the point 64, rather than at a different point along the length of the ridge.

In the embodiment illustrated in FIGS. 1-3 and 10-16, and as shown in FIG. 3, the ridge includes a radiused, V-shaped cross-section and delimits the bulges formed on either side thereof. However, as shown in FIGS. 8 and 9, it is possible to employ an alternate embodiment of the rupture disc, within which the ridge 62' is formed of a width sufficient to define opposing surfaces 66, 68 which extend between the bulges formed in the central region. The actual width chosen for the ridge varies with the size of the disc, wherein the width of the ridge typically increases with increasing disc size.

Returning to FIG. 2, the line of weakness 56 is shown to include a single uninterrupted score line extending around the bases of the bulges, and preferably includes a V-shaped groove formed in one of the surfaces 48, 50 of the disc body. The groove 56 extends into the body a predetermined depth, and this depth varies along the length of the groove to define a relatively deep groove section, designated by the arcuate line 70. The deep groove section is centrally located along the length of the groove 56 and extends around approximately one-quarter of the circumference of the central region 52. The remainder of the length of the groove to either side of the deep groove section is of constant depth and is shallow relative to the deep groove section. Preferably, the groove is formed immediately adjacent the bulges of the central region 52, but a small radial separation distance may be provided.

As illustrated in FIG. 4, the side walls of the groove are preferably angled relative to one another by an angle of about 20°. In an exemplary embodiment of a two inch diameter disc formed of stainless steel, where the thickness of the disc is 0.005 inches, the depth of the groove along the deep groove section, shown in FIG. 4, is about 0.0045 inches, and the depth of the remaining length of the groove, shown in FIG. 5, is about 0.0042 inches.

Although the groove 56 is illustrated in FIGS. 1-5, as being formed in the second surface 50 of the disc body, it is possible to form the groove in the first surface 48 of the body as shown in FIG. 6. By permitting this construction of the rupture disc, it is possible to position the groove on a surface of the disc which is protected from exposure to harmful chemicals or other environmental effects which adversely alter the operation of many conventional constructions.

The alignment ring 26 is substantially annular in shape, having an inner diameter corresponding to the inner diameter of the pipe sections 22 and the diameter of the groove 56. This inner diameter is formed with very close tolerances relative to the diameter of the groove 56 so that the inner edge 72 of the alignment ring is aligned with the V-shaped groove of the disc. By providing this arrangement, the alignment ring 26 securely retains the annular flange 54 of the disc within the insert assembly 20 when the material forming the central region 52 tears away from the disc along the groove. The alignment ring is formed of any suitable material capable of providing this support to the rupture disc, and the thickness of the ring is dictated by the physical characteristics of the material chosen. For example, for a two inch diameter application, the alignment ring is formed of stainless steel having a thickness of 0.06 inches.

Figure 11:
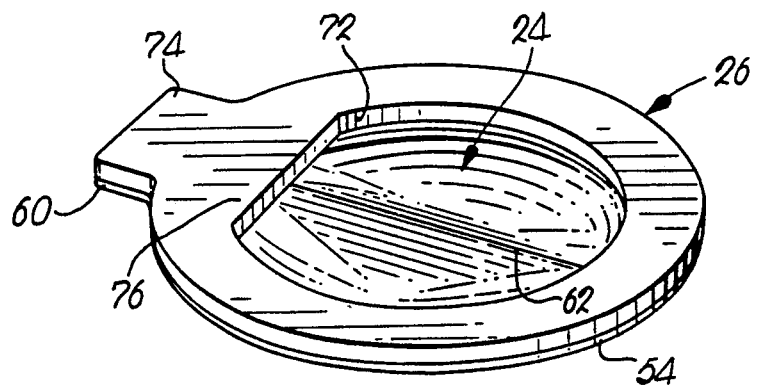
FIG. 11 is a perspective view of the reverse-acting disc assembly.
Figure 12:
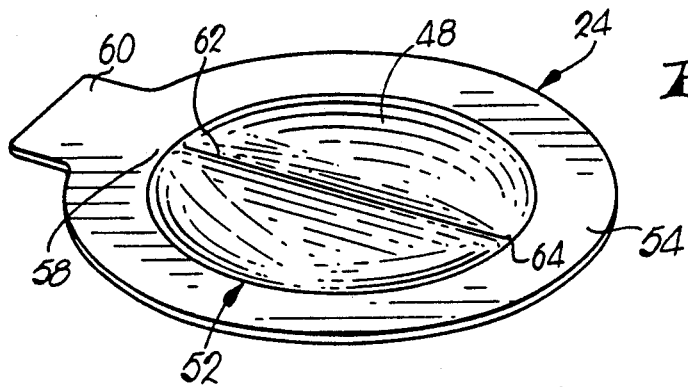
FIG. 12 is a perspective view of the disc, illustrating the normal shape of the circular central region.

As shown in FIG. 11, the alignment ring includes a radially extending tab 74 corresponding in shape and size to the tab 60 of the disc 24. In addition, a portion 76 of the inner radial edge 72 of the alignment ring adjacent the tab 74 protrudes inward of the ring by a distance sufficient to provide support to the hinge 58 of the disc during rupture to prevent fragmenting of the central region of the disc.

During formation of the rupture disc, the disc material is initially annealed, if necessary, prior to the formation of the ridge and bulges in the central region of the body. For example, where stainless steel (300 series) is used in the formation of a two inch diameter disc, the material is heated to a temperature of 1600°-1950° F. for about five minutes, and is then allowed to cool to room temperature. No water quench is employed. Examples of materials which are preferably not annealed prior to formation of the groove 56 include gold, tantalum, and titanium.

The ridge and bulges are preferably formed in the central region of the disc body by a die stamping operation and, at the same time, the groove is formed by a die scoring operation. However, other methods may be used to form a rupture disc having a construction as disclosed herein. For example, the groove may be milled or chemically etched, or may be formed in any other conventional manner.

After formation of the ridge, bulges and groove is completed, the disc 24 is annealed as described above to complete the formation of the rupture disc. If desired, a suitable layer of protective material, e.g. a non-stick coating such as that marketed under the trade name TEFLON, may be applied to one or both surfaces of the disc.

Thereafter, the rupture disc is installed within a relief passage by positioning the disc in alignment with the ring within the insert assembly, and securing the insert assembly between opposed companion flanges provided on the relief passage. As shown in FIG. 1, the disc is arranged within the passage so that the convex surface of the disc is in contact with a positive pressure P acting in a first direction within the passage.

As shown in FIG. 10, during operation of the pressurized equipment, the pressure P creates uneven stresses within the reverse-acting rupture disc. The region 78 of highest stress is located centrally along the length of the ridge 62 between the bulges of the central region 52, and concentric outer regions 80, 82, 84 of the disc body experience progressively smaller stresses.

Figure 13:
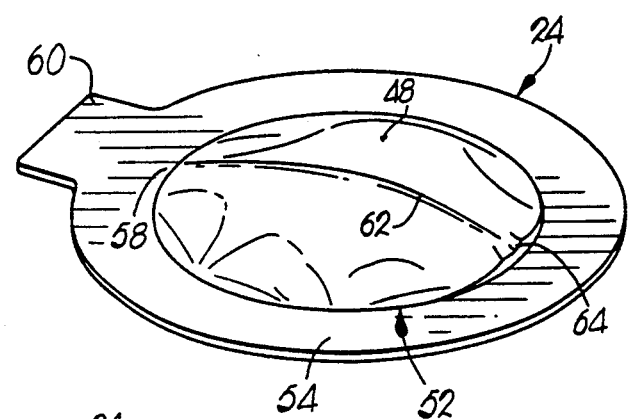
FIG. 13 is a perspective view of the disc, illustrating the shape of the central region at the point of initiation of rupture.

Because the highest stresses in the disc are experienced along the ridge 62, rupture of the disc is initiated when the stress experienced by the ridge reaches a level sufficient to cause the ridge to deform and pull away from the annular flange 54 at the point 64 of intersection between the ridge and the groove 56. The point in time at which this initiation occurs during rupture of the disc in the reverse direction is illustrated in FIG. 13, which may be compared to the unloaded disc construction shown in FIG. 12. The rupturing action initiated by the ridge is assisted by the provision of the deep groove section intersected by the ridge. If the ridge is not curved along the length thereof, it is possible that the ridge would be weaker than the deep groove section of the line of weakness 56, and could rupture at pressures below the desired burst pressure. By bowing the ridge, it is strengthened so that the point of rupture is always along the groove 56.

Figure 14:
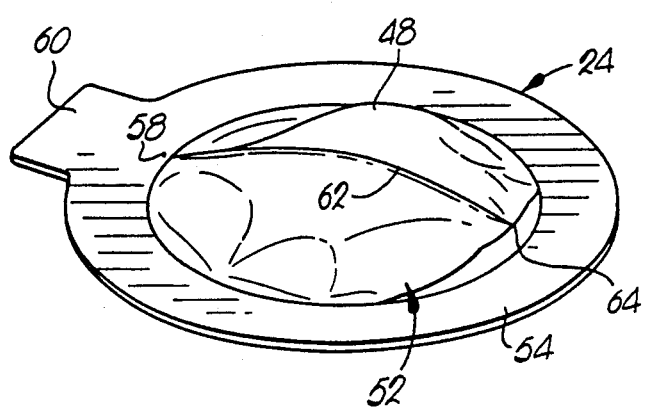
FIGS. 14–16 are perspective views of the reverse-acting disc, illustrating the shape of the central region during progressive stages of rupture.
Figure 15:
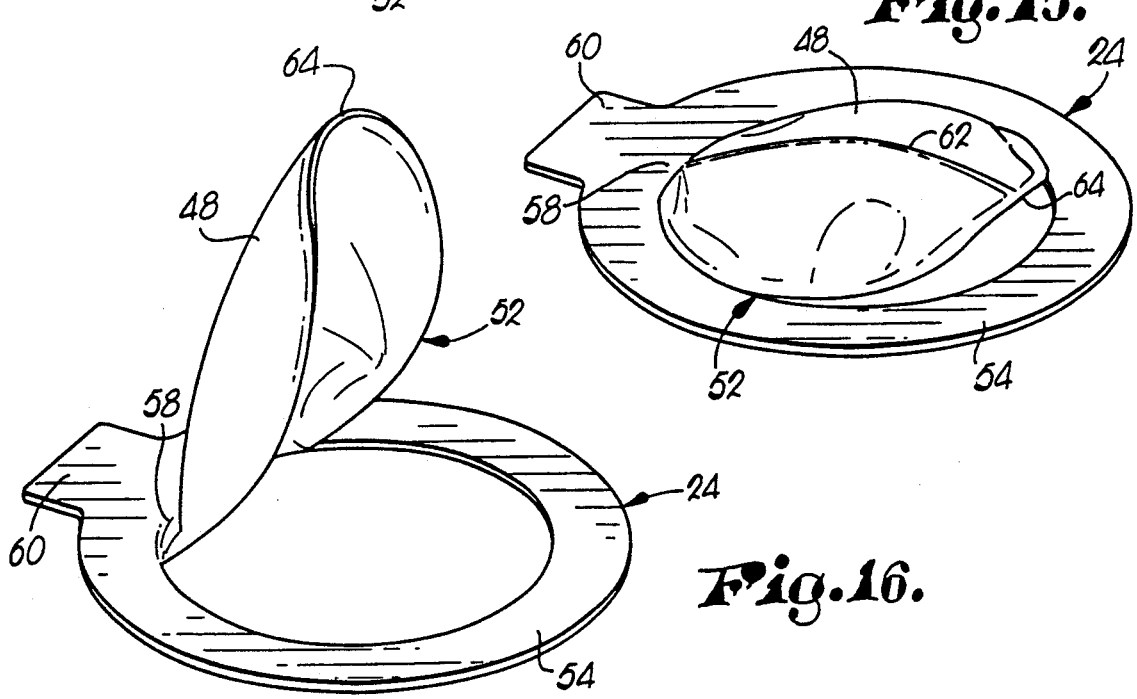
Figure 16:
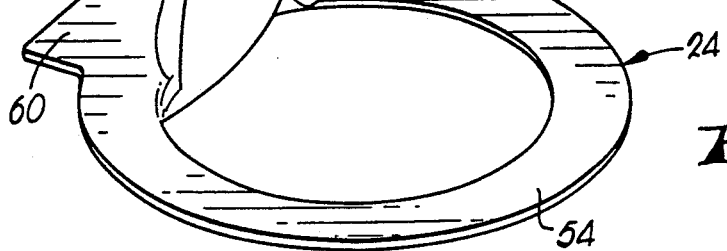

Once the ridge 62 has pulled away from the annular flange 54 and initiated rupture of the disc, as shown in FIG. 14, the concentrated stresses within the ridge cause the ridge, along with the remainder of the central region 52 of the disc, to snap away from the annular flange 54 along the groove 56, as progressively shown in FIGS. 15 and 16. Thus, the ridge acts as a stiffener for the central region of the disc, and the relatively high stress concentrations along the ridge promote complete rupture of the disc.

The deformation of the bulges during rupture has been exaggerated in FIGS. 13–16 to illustrate the progress of the rupturing action of the disc. However, actual experimentation has shown that the bulges actually retain much of their original shape during rupture, and do not deform to the degree shown when used in relatively low pressure applications of less than 80 psi.

In a vapor pressure relief system, within which compressible fluids are handled, the pressure acting on the rupture disc is maintained during the initial stages of pressure relief, and such inherent snapping action of the rupture disc is not required. However, in liquid systems, pressure drops dramatically as the disc opens, and this pressure drop may have an adverse effect on the ability of a conventional disc to open completely at low relief pressures. By providing a rupture disc in accordance with the preferred embodiment of the present invention, wherein a pair of domes or bulges define a "camel back" design defining a central stiffening ridge, the snapping action of the ridge and central region away from the annular flange permits the rupture disc to open completely, as shown in FIG. 16, and allows the assembly to be used to vent pressures in liquid handling equipment as well as in vapor systems.

Figure 17:
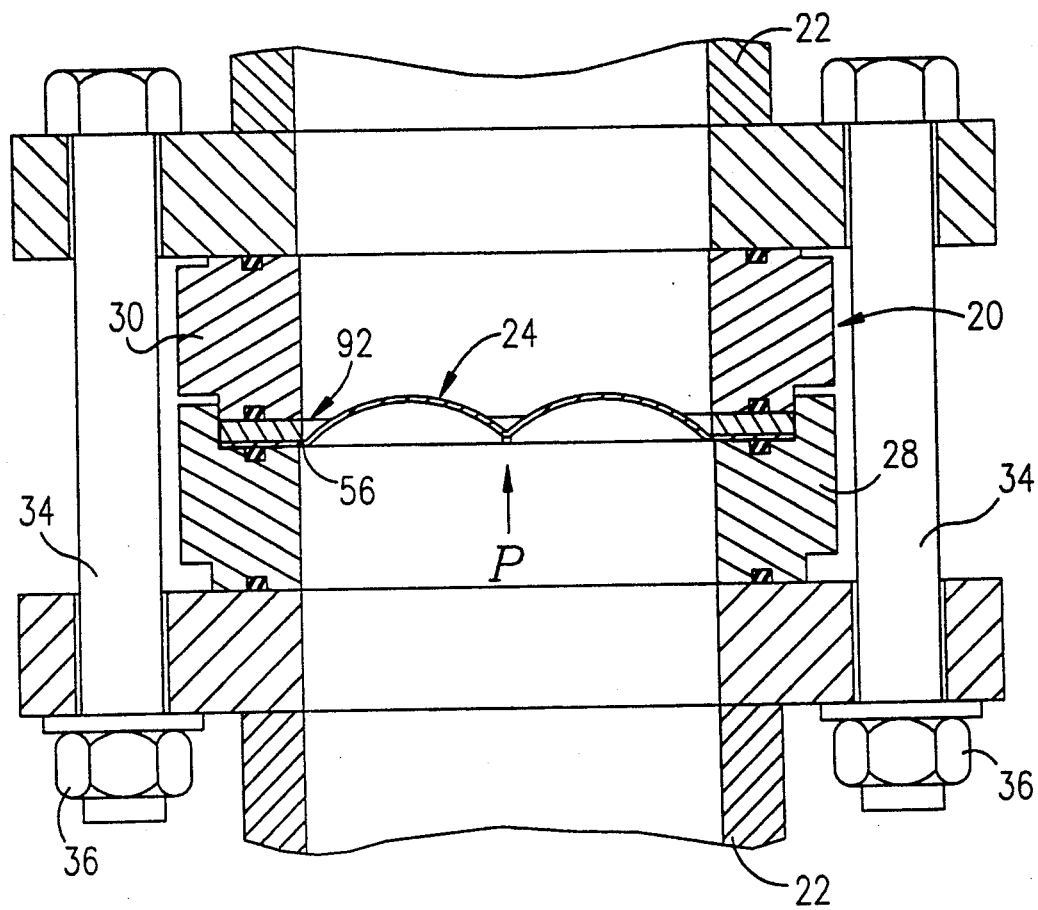
FIG. 17 is a sectional view of a forward-acting rupture disc assembly constructed in accordance with the preferred embodiment, illustrating the manner in which the assembly is installed in line with a pressurized conduit.

These same benefits are obtained when a disc constructed in accordance with the present invention is employed in a forward-acting pressure relief system. Such a system is illustrated in FIG. 17, and includes an insert assembly 90 which is retained between a pair of opposed pipe sections 22, and a rupture disc 24 and alignment ring 92 supported together within the insert assembly.

The insert assembly 90 is substantially identical to the insert assembly 20 described above, and is installed in a similar fashion except that, when installed, the disc is arranged within the passage so that the concave surface 48 of the disc is in contact with a positive pressure P acting in a first direction within the passage.

The disc 24 is constructed of the same design regardless of whether it is used in a reverse-acting or forward-acting environment, and the same benefits are obtained by the forward-acting assembly as are achieved with the reverse-acting construction discussed above. For example, when used in a forward-acting assembly, the disc experiences uneven stresses under the pressure P, the region of highest stress being located centrally along the length of the ridge 62 between the bulges of the central region 52.

Figure 18:
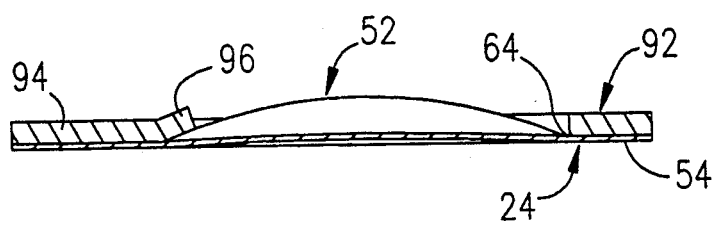
FIG. 18 is a side sectional view of the disc assembly shown in FIG. 17.
Figure 19:
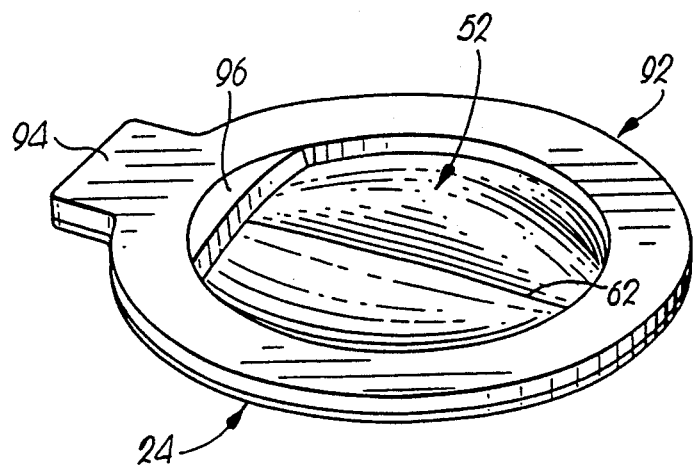
FIG. 19 is a perspective view of the disc assembly shown in FIG. 17.

As shown in FIG. 19, the alignment ring 92 of the forward-acting assembly has a radially extending tab 94 corresponding in size and shape to the tab 60 of the disc 24. In addition, a portion 96 of the inner radial edge of the alignment ring adjacent the tab 94 protrudes inward of the ring by a distance sufficient to provide support to the hinge 58 of the disc during rupture to prevent fragmenting of the central region of the disc. As shown in FIG. 18, the portion 96 is also bulged or curved to receive the concavo-convex bulges formed in the central region 52 of the disc.

Because the highest stresses in the disc are experienced along the ridge 62, rupture of the disc is initiated when the stress experienced by the ridge reaches a level sufficient to cause the ridge to deform and pull away from the annular flange 54 at the point 64 of intersection between the ridge and the groove 56. The rupturing action initiated by the ridge in a forward-acting assembly is assisted by the provision of the deep groove section intersected by the ridge.

One added benefit obtained from the use of the preferred rupture disc construction in a forward-acting system results from the fail safe feature that rupture of the disc will occur at a pressure below the rated burst pressure if the disc is improperly installed within the passage. For example, because rupture in the reverse direction occurs at a lower pressure than in the forward direction, if a disc designed for forward-acting rupture is installed backward, then the disc will burst at a pressure below the rated burst pressure.

Although the invention has been described with reference to the illustrated preferred embodiment, it is noted that substitutions may be made and equivalents employed herein without departing from the scope of the invention as recited in the claims.

What is claimed is:

1. A multiple-dome, scored rupture disc comprising:
   an essentially flat, non-apertured disc body presenting opposing first and second disc surfaces, and including a circular, central region and a flat annular flange surrounding the central region; and
   an arcuate line of weakness circumscribing the central region except for a portion of the circumference of the central region defining a hinge,
   the central region being divided by a diametrical ridge into two side-by-side semicircular halves within which the disc is bulged to form a plurality of separate concavo-convex bulges in the body.

2. A rupture disc as recited in claim 1, wherein the diametrical ridge extends between the hinge and a point diametrically opposed to the hinge relative to the central region.

3. A rupture disc as recited in claim 1, wherein the line of weakness is formed by a scored line including a groove formed in one of the surfaces of the disc body.

4. A rupture disc as recited in claim 3, wherein the bulges define concavities in the first surface and convexities in the second surface, the groove being formed in the first surface.

5. A rupture disc as recited in claim 3, wherein the bulges define concavities in the first surface and convexities in the second surface, the groove being formed in the second surface.

6. A rupture disc as recited in claim 3, wherein the groove is V-shaped, including side walls which are angled relative to one another by an angle of about 20°.

7. A rupture disc as recited in claim 3, wherein the groove extends into the body a predetermined depth which varies along a length of the groove to define a relatively deep groove section opposite the hinge, the remaining length of the groove being relatively shallow.

8. A rupture disc as recited in claim 7, wherein the deep groove section extends around substantially one-quarter of the circumference of the central region.

9. A rupture disc as recited in claim 1, wherein the body is formed of a material selected from the group consisting of stainless steel, nickel, monel, inconel, gold, silver, aluminum, tantalum, titanium, and copper.

10. A rupture disc as recited in claim 1, wherein the first and second surfaces are bowed along a length of the diametrical ridge so that the ridge is curved along the length thereof.

11. A rupture disc as recited in claim 1, wherein a single bulge is formed in each semicircular half of the central region, the bulges covering substantially the entire central region apart from the ridge.

* * * * *